April 21, 1925.
W. V. JOHNSON
1,534,123
ROLLER BEARING JOURNAL BOX
Filed Jan. 5, 1922
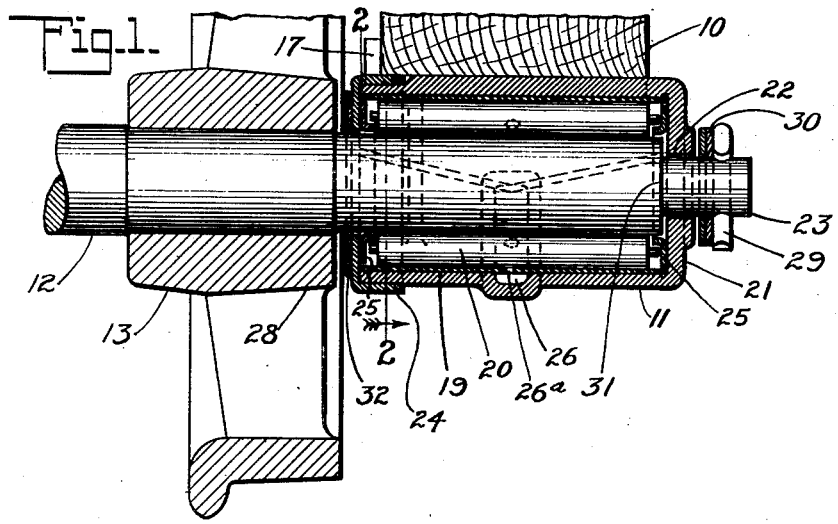
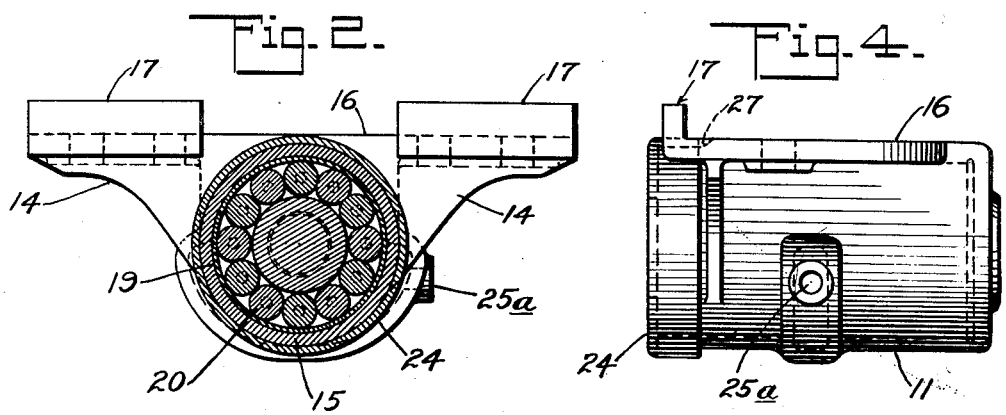
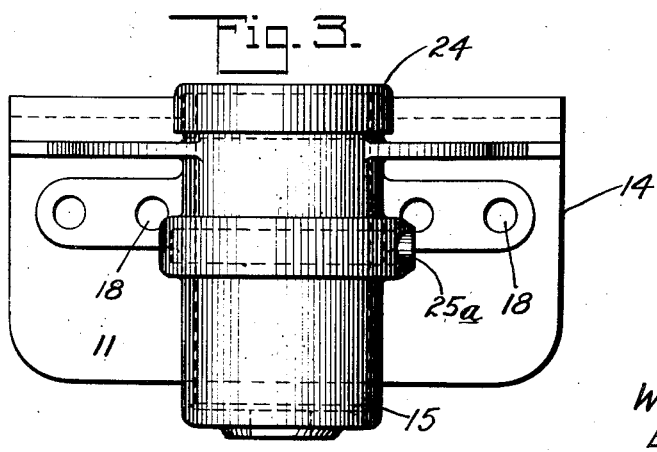
INVENTOR:
Warren V. Johnson
BY J. H. Gibbs
ATTORNEY.

Patented Apr. 21, 1925.

1,534,123

UNITED STATES PATENT OFFICE.

WARREN V. JOHNSON, OF BLOOMSBURG, PENNSYLVANIA, ASSIGNOR TO AMERICAN CAR AND FOUNDRY COMPANY, OF NEW YORK, N. Y., A CORPORATION OF NEW JERSEY.

ROLLER-BEARING JOURNAL BOX.

Application filed January 5, 1922. Serial No. 527,106.

*To all whom it may concern:*

Be it known that I, WARREN V. JOHNSON, residing at Bloomsburg, Columbia County, State of Pennsylvania, and being a citizen of the United States, have invented certain new and useful Improvements in a Roller-Bearing Journal Box, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a vertical sectional view taken longitudinally through a novel form of roller bearing journal box;

Fig. 2 is a vertical sectional view taken transversely of the box on line 2—2 of Fig. 1 and looking in the direction indicated by the arrow;

Fig. 3 is a plan of the bottom of the box, and

Fig. 4 is a side elevational view thereof.

The present invention relates to roller bearing journal boxes of the type commonly used in mining and other industrial car equipment in which the journal boxes are positioned outside the wheels of the car.

An object of my invention is to provide a roller bearing journal box adapted for assembling with axles having wheels non-rotatably mounted thereon.

A further object is to provide means associated with the journal box designed to maintain the proper operating relation between the wheel and journal box.

In the drawings, 10 represents the car body of a mining car to which is secured in any suitable manner the journal box 11 adapted to receive axle 12 fixed in wheel 13 supporting it. The journal box 11 is provided with suitable frame-work 14 preferably extending to opposite sides of the roller bearing housing portion 15 and having the car body engaging face 16 and box alining flanges 17 arranged to engage respectively the under face and a vertical face of said car body. The frame-work 14 of the box is provided with openings 18 to receive bolts or like fastening devices for securing the box to the car body.

The housing portion 15 is open at its inner end to receive a roller bearing sleeve 19 providing a suitable wearing surface for the rollers 20 riding on the axle 12 and said sleeve. To provide abutments for the sleeve and to retain the rollers, the housing is provided at the outer end thereof with a wall portion 21 perforated at 22 to receive and provide a bearing for a reduced portion 23 of the axle, the inner end opening of the housing being closed by an annular flanged cap piece 24 secured thereon in any suitable manner, preferably by forcing same to position under considerable pressure while hot to insure a shrinkage fit upon the housing. The rollers 20 are loosely mounted and are held in assembled operative relation by means of flanged annular pieces 25 surrounding the axle 12 and positioned at housing wall portion 21 and wall piece 24. These flanged pieces may be separate as shown or may form part respectively, of the housing wall portion 21 and wall piece 24. The housing 15 is provided with an oil opening 25ᵃ communicating with an oil duct 26 formed in the wall of the housing and oil hole 26ᵃ in roller bearing sleeve 19, permitting thorough lubrication of the moving roller bearing elements.

The flanged cap piece or inner end wall portion 24, like the outer end wall portion 21 of the housing, is perforated only to receive axle 12, thus providing an oil-tight and dust proof closure for the bearing elements. The flanges 17 of the journal box are spaced apart, and the car body engaging face 16 of the box between said flanges is cored out as shown at 27 to accommodate the flange of the cap 24, so that, with said cap in position as indicated in Figs. 1, 3, and 4, its flange will extend partially under the car body 10 and substantially in line with the car body engaging face 16 of the box and in the plane of the car body engaging flanges 17. Thus positioned, a portion of the cap protrudes rearwardly beyond said flanges 17 in position to engage hub 28 of the wheel 13 and co-operates with the flanges 17 to insure sufficient clearance between car body and wheel to prevent any interference between them.

Due to the racking stresses of service the tendency of the car body to weave during car movement brings about certain disintegration of the car framing, causing the car sides to spread apart and carry with them the journal boxes secured thereto. In cases where roller bearings have been used the journal boxes, spreading apart with the car sides, carry with them the rollers housed therein beyond the ends of the axles, resulting in the collapse of the assembly and destruction of the rollers.

To prevent the spreading apart of the car sides 10, I extend the axles 12 through and beyond the outer end walls 21 of the journal boxes 11 and secure the boxes and axles from separation by means of fastening devices 29 shown as linch pins extending through the axle 12. One or more wearing plates 30 may be positioned on the axle between the outer end walls 21 of the journal boxes and the linch pins 29 to reduce friction between said parts. To prevent the loss of oil through openings 22 in the outer end walls 21 of the boxes, that portion 23 of the axle 12 received within said opening is reduced in diameter to provide a shoulder portion 31 on the axle designed to arrest the flow of oil on the axle outwardly beyond said shoulder through the action of the centrifugal force of the rotating axle upon any oil adhering to the surface of shoulder 31. To lessen the friction between cap piece 24 of the journal box 11 and hub 28 of wheel 13, one or more wearing plates 32 may be used.

The journal boxes with their contained roller bearing parts may be released from the axles by extracting linch pins 29. Should the boxes be damaged, their respective roller bearing parts, if unimpaired, may be removed for further service in other boxes by removing the separate cap pieces or inner wall members 24 and withdrawing the contained roller parts from the boxes.

It will be noted that by reason of the extension of axle 12 through the outer end wall 21 of the housing, the metal of said wall surrounding the reduced portion of the axle provides a bearing for the same within perforation 22 and prevents lateral displacement of the axle within the housing, insuring perfect alinement between the roller bearing sleeve 19 and the axle and preventing the jamming of the rollers between them, permitting the load to be distributed throughout the entire length of the rollers and a corresponding distance on the axle between shoulder 31 thereof and the inner wall member 24 of the housing.

What I claim is:

1. A journal box comprising a housing and attaching frame-work extending to opposite sides of said housing and providing a car body engaging face, removable and fixed wall portions covering respectively the inner and outer ends of said housing, and box alining flanges on opposite sides of said housing and in the plane of said removable wall member.

2. A journal box comprising a housing and attaching frame-work extending to opposite sides of said housing and providing a car body engaging face, and an annular flanged member removably mounted on said housing and forming the inner wall thereof, said annular member being arranged with its flange substantially in the plane of said car body engaging face.

3. A journal box comprising a housing and attaching frame-work extending to opposite sides of said housing and providing a car body engaging face, an annular flanged member removably mounted on said housing and forming the inner wall thereof, a pair of alining flanges spaced apart and arranged on opposite sides of said housing, said car body engaging face being cored out between said alining flanges to receive said removable annular member.

4. A journal box comprising a housing and attaching frame-work extending to opposite sides of said housing, removable and fixed wall portions covering respectively the inner and outer ends of said housing, and box alining flanges on opposite sides of said housing and in the plane of said removable wall member, portions of said removable member extending rearwardly beyond the plane of said alining flanges.

In witness whereof I have hereunto set my hand in the presence of two witnesses.

WARREN V. JOHNSON.

Witnesses:
R. H. LEARN,
F. B. WHITE.